(12) United States Patent
Chuang

(10) Patent No.: US 7,302,983 B1
(45) Date of Patent: Dec. 4, 2007

(54) THERMOINSULATION METAL ENCAUSTIC TILE MAKING MACHINE

(76) Inventor: Sen-Jung Chuang, No. 90-10, Hsia Kwei Jou San, Tan Shui Chen, Taipei County (TW)

( * ) Notice: Subject to any disclaimer, the term of this patent is extended or adjusted under 35 U.S.C. 154(b) by 541 days.

(21) Appl. No.: 11/038,072

(22) Filed: Jan. 21, 2005

(51) Int. Cl.
B29C 65/70 (2006.01)
B29C 47/14 (2006.01)

(52) U.S. Cl. .................. 156/459; 156/461; 156/443; 156/501; 156/500

(58) Field of Classification Search ............ 156/443, 156/459, 461, 500, 501; 73/307, 311; 29/DIG. 29; 425/110, 112
See application file for complete search history.

(56) References Cited

U.S. PATENT DOCUMENTS

| 3,174,887 | A | * | 3/1965 | Voelker | 156/79 |
| 3,738,895 | A | * | 6/1973 | Paymal | 156/443 |
| 3,792,141 | A | * | 2/1974 | Offutt | 264/46.3 |
| 5,173,221 | A | * | 12/1992 | Payne | 264/34 |
| 6,957,558 | B1 | * | 10/2005 | Chuang | 72/130 |
| 7,040,001 | B1 | * | 5/2006 | Chuang | 29/564 |

* cited by examiner

*Primary Examiner*—George Koch
(74) *Attorney, Agent, or Firm*—Troxell Law Office, PLLC

(57) ABSTRACT

A thermoinsulation metal encaustic tile making machine practical to selectively make thermoinsulation metal encaustic tiles having a thin-layer non-metal top sheet or thermoinsulation metal encaustic tiles having a top metal sheet is disclosed to include a top sheet feeder, a top metal sheet shape-forming roller unit, a thermoinsulation film feeder, a machine base, a polyurethane foaming unit, a top transferring mechanism, and a cutting unit.

3 Claims, 12 Drawing Sheets

THERMOINSULATION METAL ENCAUSTIC TILE MAKING MACHINE

BACKGROUND AND SUMMARY OF THE INVENTION

The present invention relates to a machine for making tiles and more particularly, to a thermoinsulation metal encaustic tile making machine, which is practical for making thermoinsulation metal encaustic tiles having a thin-layer non-metal top sheet as well as thermoinsulation metal encaustic tiles having a top metal sheet.

Conventional metal encaustic tiles cannot effectively isolate heat. Therefore, thermoinsulation metal encaustic tiles are developed. Regular thermoinsulation metal encaustic tiles include two types (see FIGS. 1 and 2). The thermoinsulation metal encaustic tile 8' shown in FIG. 1 comprises a metal encaustic tile 82', a thin-layer non-metal top sheet 81' (polyvinyl chloride, leather, or aluminum foil), and polyurethane foam 80' filled in between the metal encaustic tile 82' and the thin-layer non-metal top sheet 81'. The thermoinsulation metal encaustic tile 8 shown in FIG. 2 comprises a metal encaustic tile 82, a top metal sheet 81, and polyurethane foam 80' filled in between the metal encaustic tile 82 and the top metal sheet 81. These two different types of thermoinsulation metal encaustic tiles are made by two different thermoinsulation metal encaustic tile making machines. It requires much installation cost and floor space to prepare two different thermoinsulation metal encaustic tile making machines.

The present invention has been accomplished under the circumstances in view. It is therefore the main object of the present invention to provide a thermoinsulation metal encaustic tile making machine, which is practical for making thermoinsulation metal encaustic tiles having a thin-layer non-metal top sheet as well as thermoinsulation metal encaustic tiles having a top metal sheet. It is another object of the present invention to provide a thermoinsulation metal encaustic tile making machine, which, which prevents wrinkling of the supplied thin-layer non-metal top sheet when making thermoinsulation metal encaustic tiles having a non-metal top sheet.

To achieve these and other objects of the present invention, the thermoinsulation metal encaustic tile making machine comprises a machine base, the machine base comprising a metal encaustic tile conveyer, which has a plurality of recessed portions for the positioning of metal encaustic tiles to be delivered, top guide assemblies, a support frame for supporting biasing tubes of a thermoinsulation film feeder, a nozzle holder adapted to support a jet nozzle assembly of a polyurethane foaming unit, a top rack spaced from the nozzle holder at a distance for supporting a rack of a top sheet feeder), a top cover covering over a rear side thereof, and a drying unit mounted under the top cover; a top sheet feeder, the top sheet feeder comprising a rack mounted on the top rack of the machine base at a top side, a locating frame provided at a front side of the top rack of the machine base, a guide shaft provided at a front side of the top rack of the machine base and spaced below the locating frame, two sheet supply rolls and provided at a top side of the rack of the top sheet feeder, two guide rollers respectively provided at front and rear sides of the rack of the top sheet feeder, and two rotary cutters bilaterally provided at a front side of the rack of the top sheet feeder and adapted to rotate a respective cutter blade thereof to cut a respective transverse crevice in two opposite lateral sides of a supplied top sheet member; a top metal sheet shape-forming roller unit provided at a front side of the machine base and adapted to roller-ram a metal sheet material into a predetermined shape of top metal sheet having a corner flange, the top metal sheet shape-forming roller unit comprising a support frame, a roller holder frame mounted on the support frame at a top side in a sloping position, and a plurality of ramming roller installed in the roller holder frame and adapted to ram the supplied metal sheet material into the desired top metal sheet having a corner flange, for enabling the top metal sheet to be delivered forwards by the top guide assemblies of the machine base to the place between a front side of the top transferring mechanism and a metal encaustic tile conveyer; a thermoinsulation film feeder fixedly fastened to a front side of the machine base, the thermoinsulation film comprising a flat bottom frame set in a sloping position below the elevation of the guide rollers of the top guide assemblies at the machine base, two upright reels bilaterally provided at a top side of the flat bottom frame, and two rolls of thermoinsulation films respectively loaded on the upright reels, two sets of tension rods bilaterally provided at a top side of the flat bottom frame and adapted to guide the thermoinsulation films out of the upright reels to a respective biasing tube; a polyurethane foaming unit, the polyurethane foaming unit comprising a polyurethane foam making device for processing polyurethane into polyurethane foam, and a jet nozzle assembly extended from the polyurethane foam making device and pivotally mounted in the nozzle holder, the jet nozzle assembly comprising a nozzle tube controlled to spray polyurethane foam; a top transferring mechanism, the top transferring mechanism comprising a front transmission cylinder pivotally mounted inside the top rack of the machine base, rear transmission cylinder pivotally mounted in the machine base under the top cover, and a conveying belt coupled between the front transmission cylinder and the rear transmission cylinder and spaced from the metal encaustic tile conveyer of the machine base at a distance; and a cutting unit abutted against the machine base at a rear side, the cutting unit comprising a rack, a material clamping device provided at a top side of the rack of the cutting unit, and a cutter assembly provided at a top side of the rack of the cutting unit, the cutter assembly of the cutting unit comprising a cutter holder, an air cylinder mounted in the rack of the cutting unit and adapted to lift/lower the cutter holder of the cutting unit, and a rotary cutter blade pivoted to the cutter holder of the cutting unit and adapted to cut off the processed thermoinsulation metal encaustic tile, the material clamping device comprising a clamping plate and a plurality of vertical air cylinders vertically disposed above the clamping plate and adapted to move the clamping plate vertically and to hold down the processed thermoinsulation metal encaustic tile for cutting. Further, each biasing tube defines a longitudinally extended flat channel, which has a conical front guide face for guiding a respective thermoinsulation film into the respective longitudinally extended flat channel, so that the thermoinsulation film is slightly curved when passing through the longitudinally extended flat channel. Further, the thin-layer non-metal top sheet supplied from the sheet supply roll is selected from a material group including polyvinyl chloride, leather, and aluminum foil material.

DETAILED DESCRIPTION OF THE INVENTION

Figure 1:
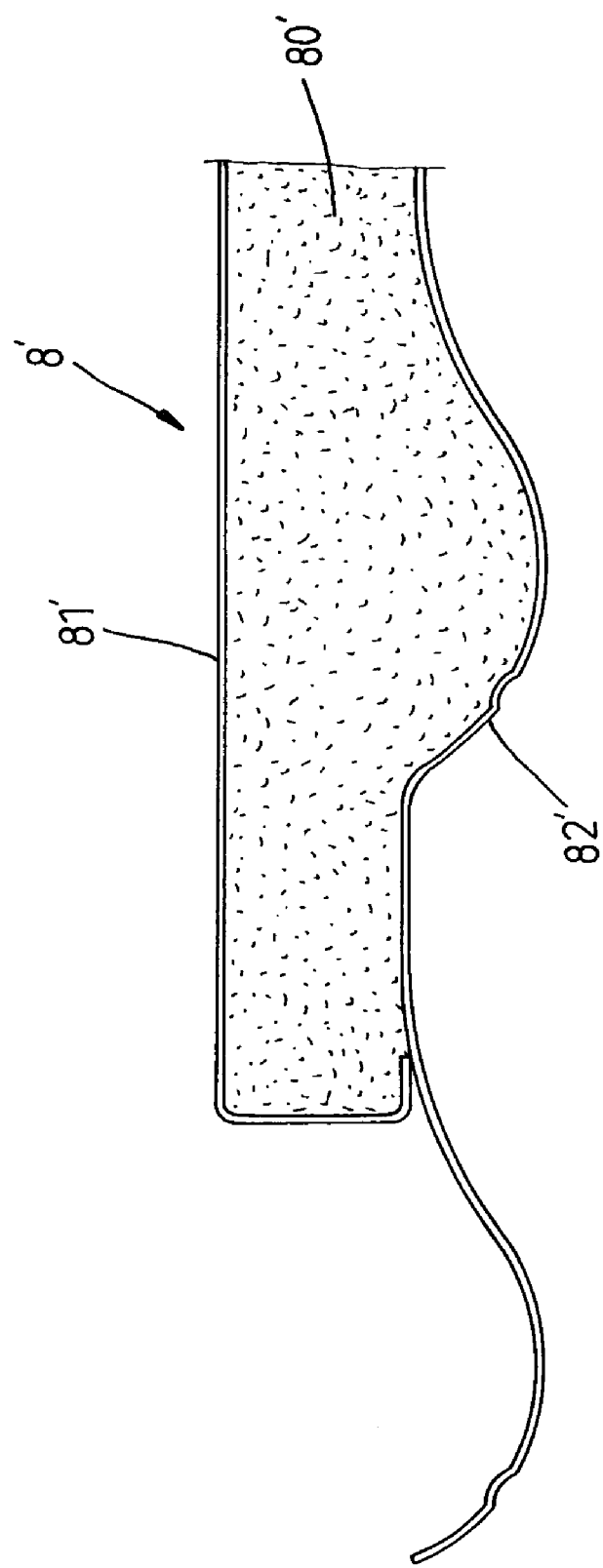
FIG. 1 is a sectional view of a thermoinsulation metal encaustic tile having a thin-layer non-metal top sheet.

Referring to FIGS. 3~10, a thermoinsulation metal encaustic tile making machine in accordance with the present invention is shown comprising a top sheet feeder 5, a top metal sheet shape-forming roller unit 1, a thermoinsulation film feeder 2, a machine base 3, a polyurethane foaming unit 4, a top transferring mechanism 6, and a cutting unit 7.

The top sheet feeder 5 (see FIGS. 5 and 6) comprises a rack 36 mounted on the top side of a top rack 35 of the machine base 3, a locating frame 51 provided at the front side of the top rack 35 of the machine base 3, a guide shaft 52 provided at the front side of the top rack 35 of the machine base 3 and spaced below the locating frame 51, two sheet supply rolls 53 and 54 provided at the top side of the rack 36, two guide rollers 55 and 56 respectively provided at the front and rear sides of the bottom of the rack 36, and two rotary cutters 57 bilaterally provided at the front side of the rack 36 and adapted to rotate a respective cutter blade 571 to cut a respective transverse crevice 810' in the two opposite lateral sides of the supplied top sheet member 81' (see also FIG. 1).

Figure 2:
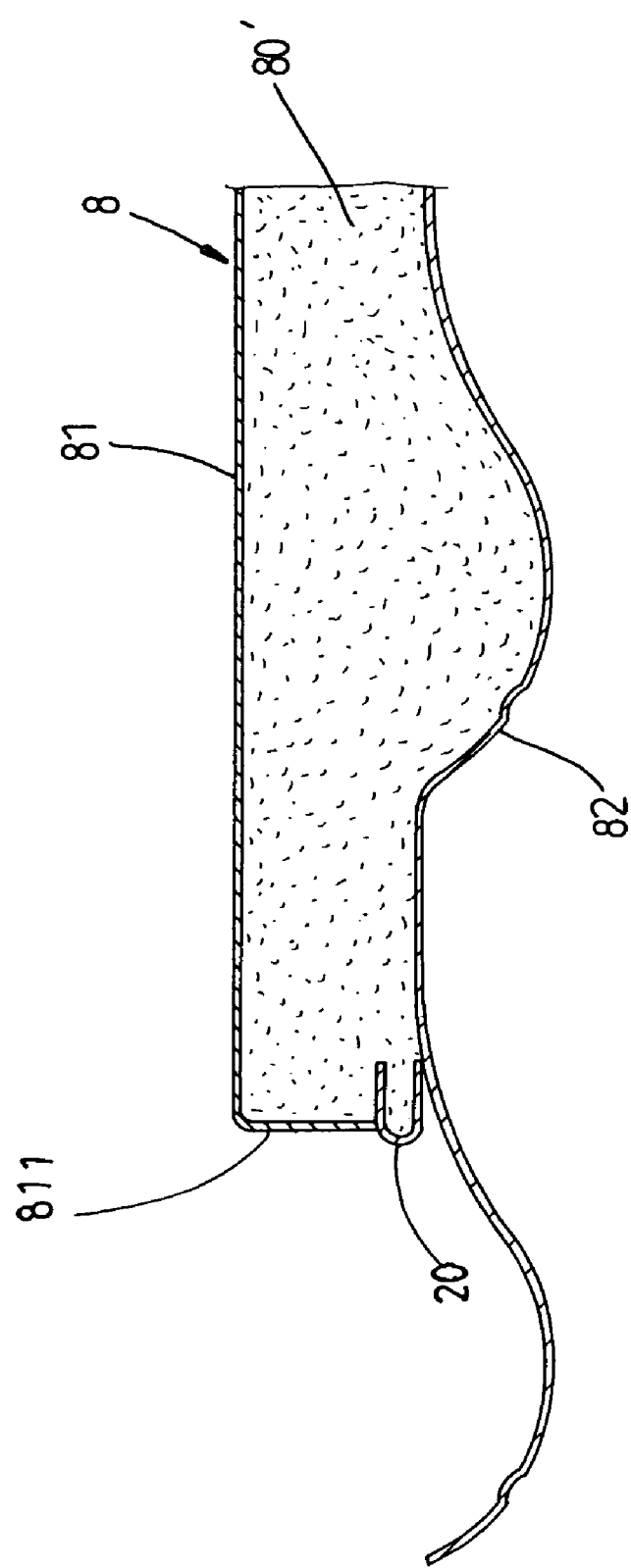
FIG. 2 is a sectional view of a thermoinsulation metal encaustic tile having a top metal sheet.
Figure 3:
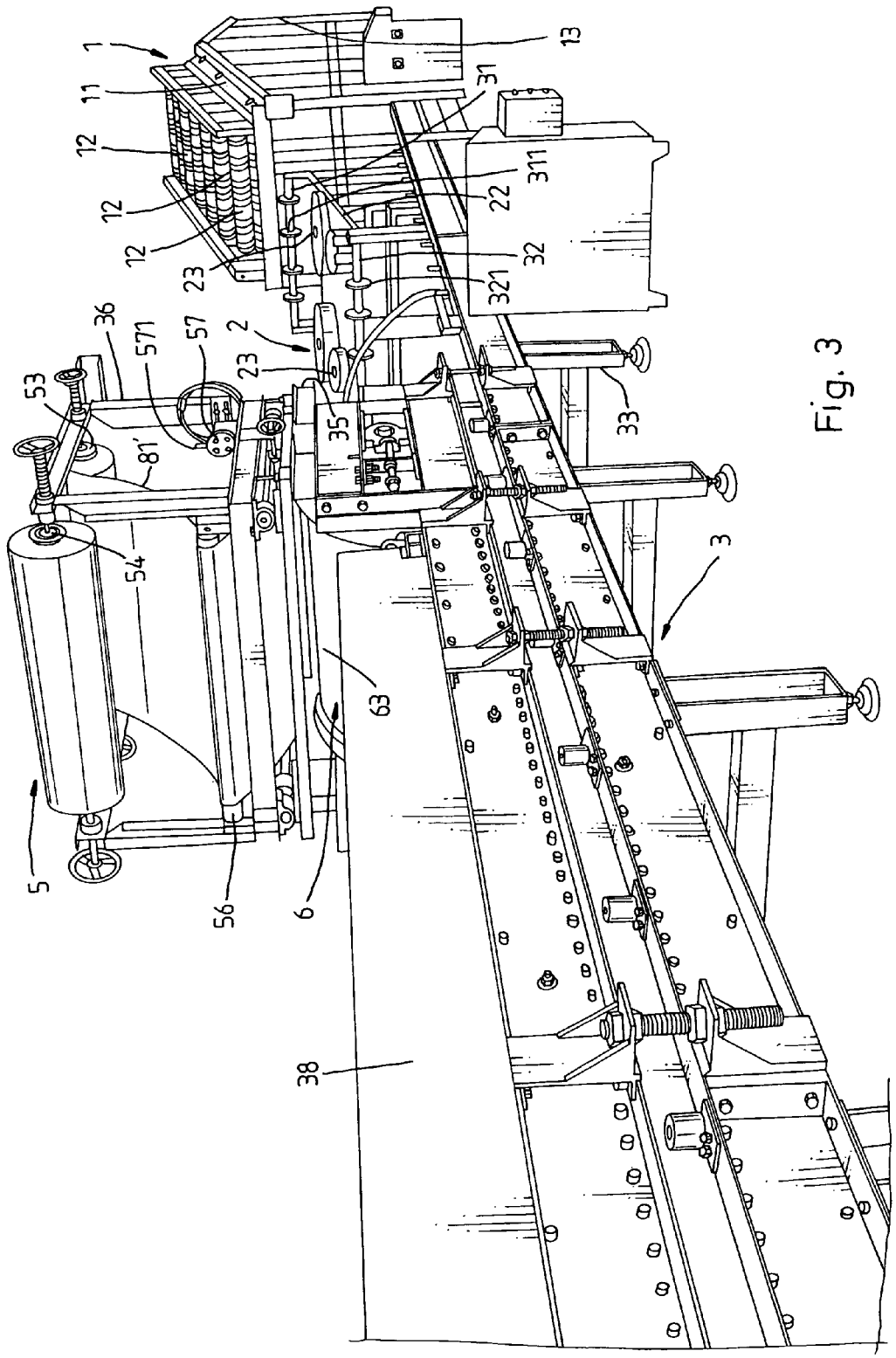
FIG. 3 is a perspective view of a part of a thermoinsulation metal encaustic tile making machine according to the present invention.
Figure 4:
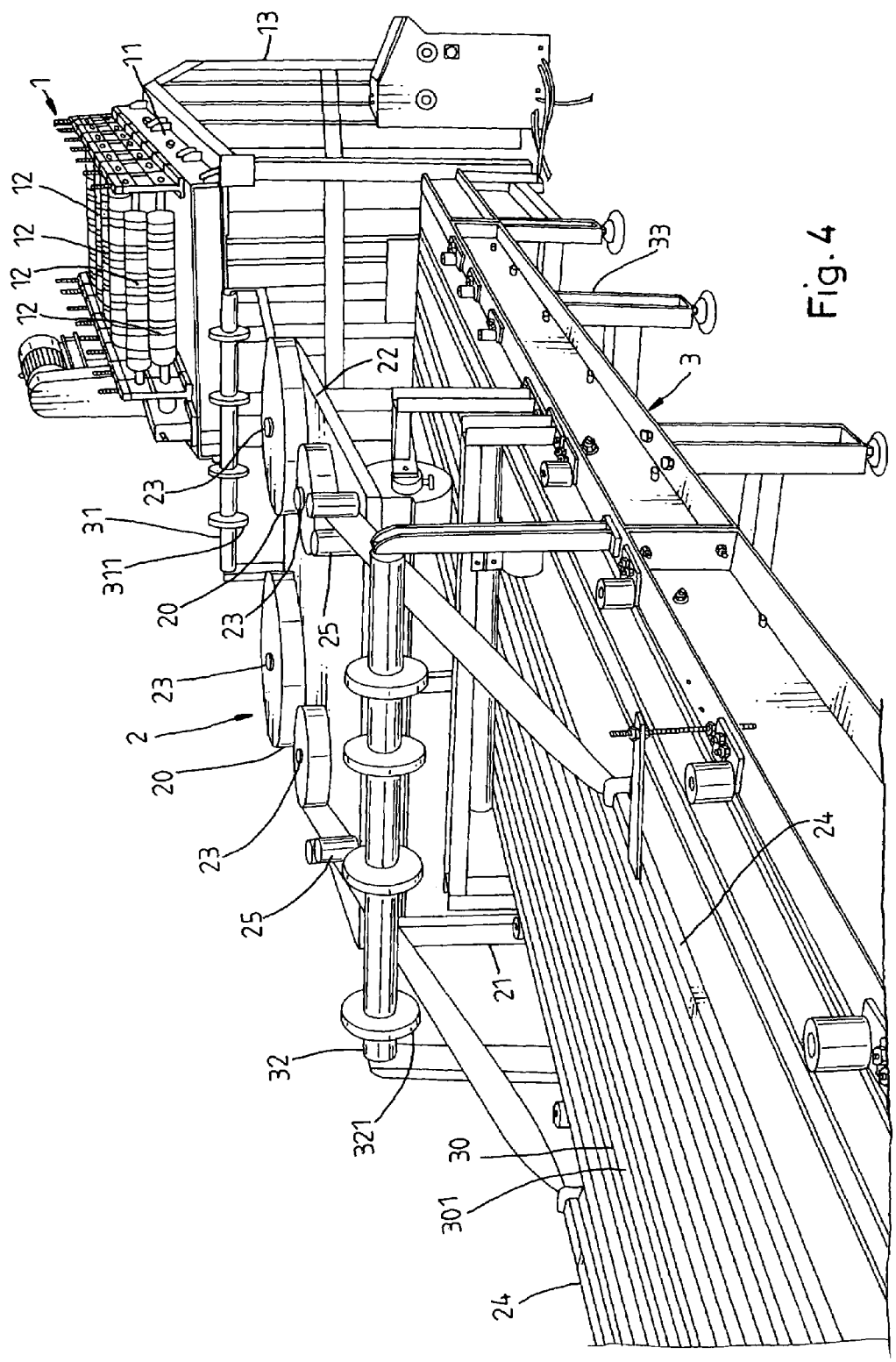
FIG. 4 is an enlarged view of a part of the thermoinsulation metal encaustic tile making machine according to the present invention.
Figure 5:
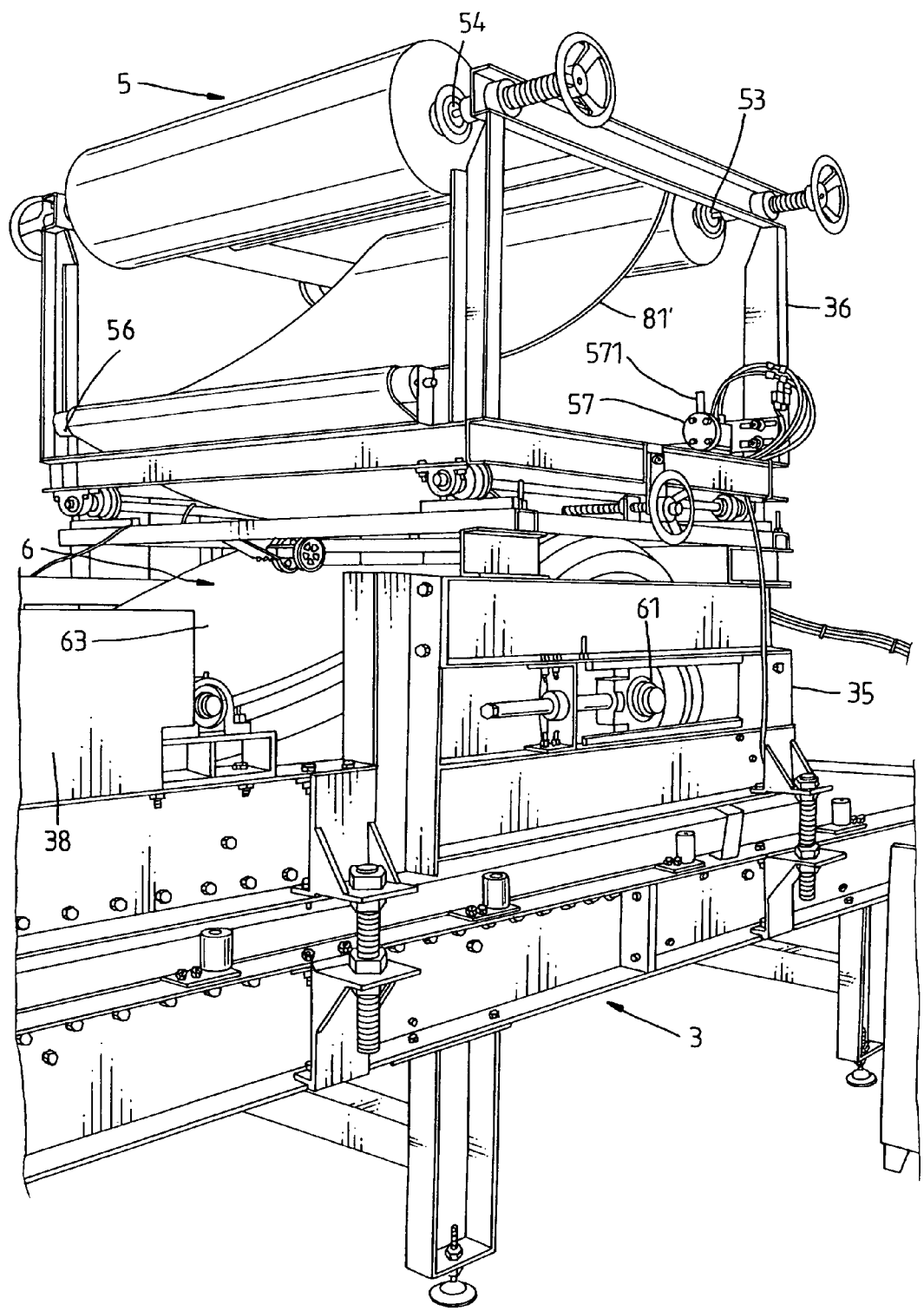
FIG. 5 is an enlarged view of another part of the thermoinsulation metal encaustic tile making machine according to the present invention.
Figure 6A:
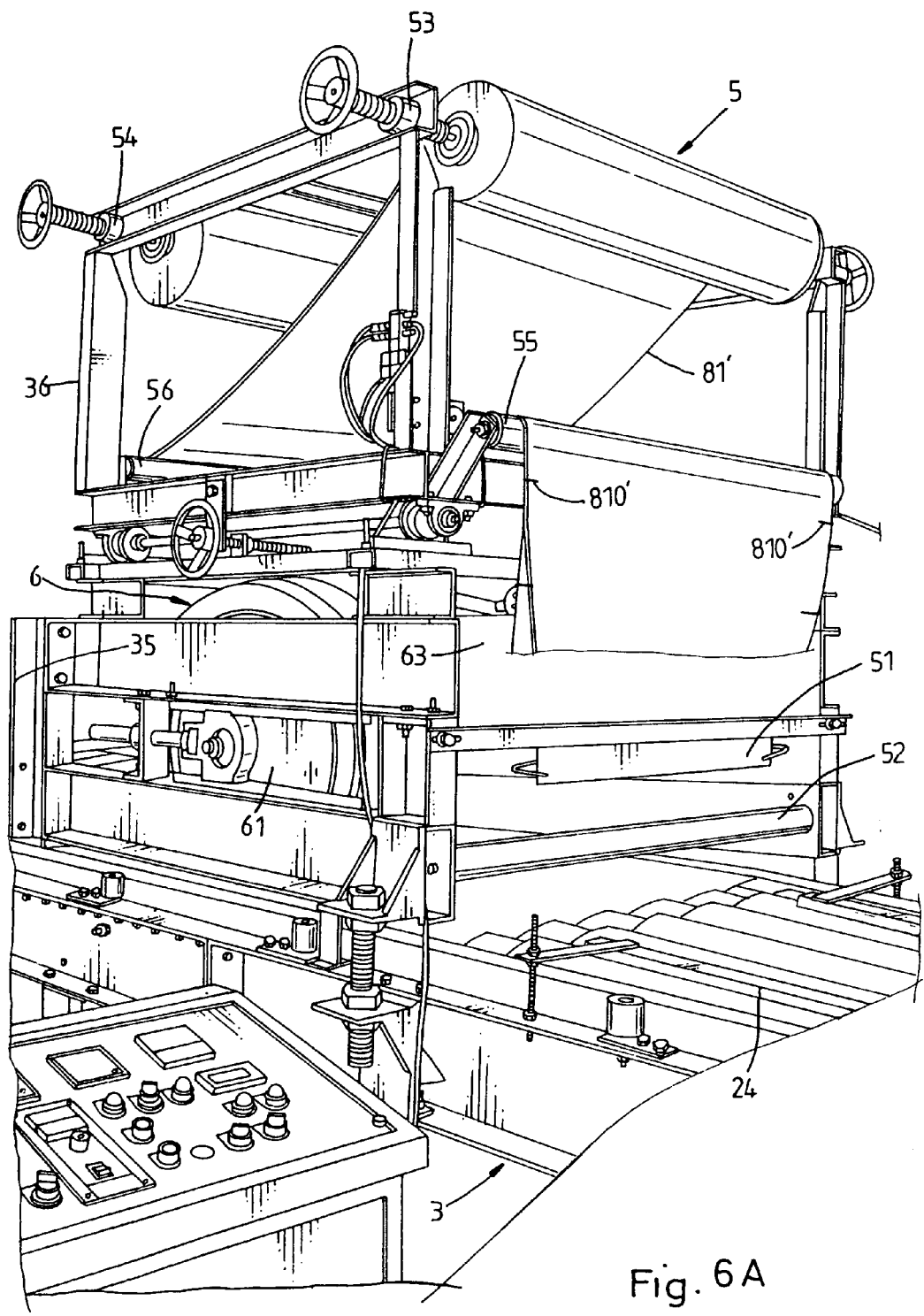
FIG. 6A corresponds to FIG. 5 but viewed from another angle.
Figure 6B:
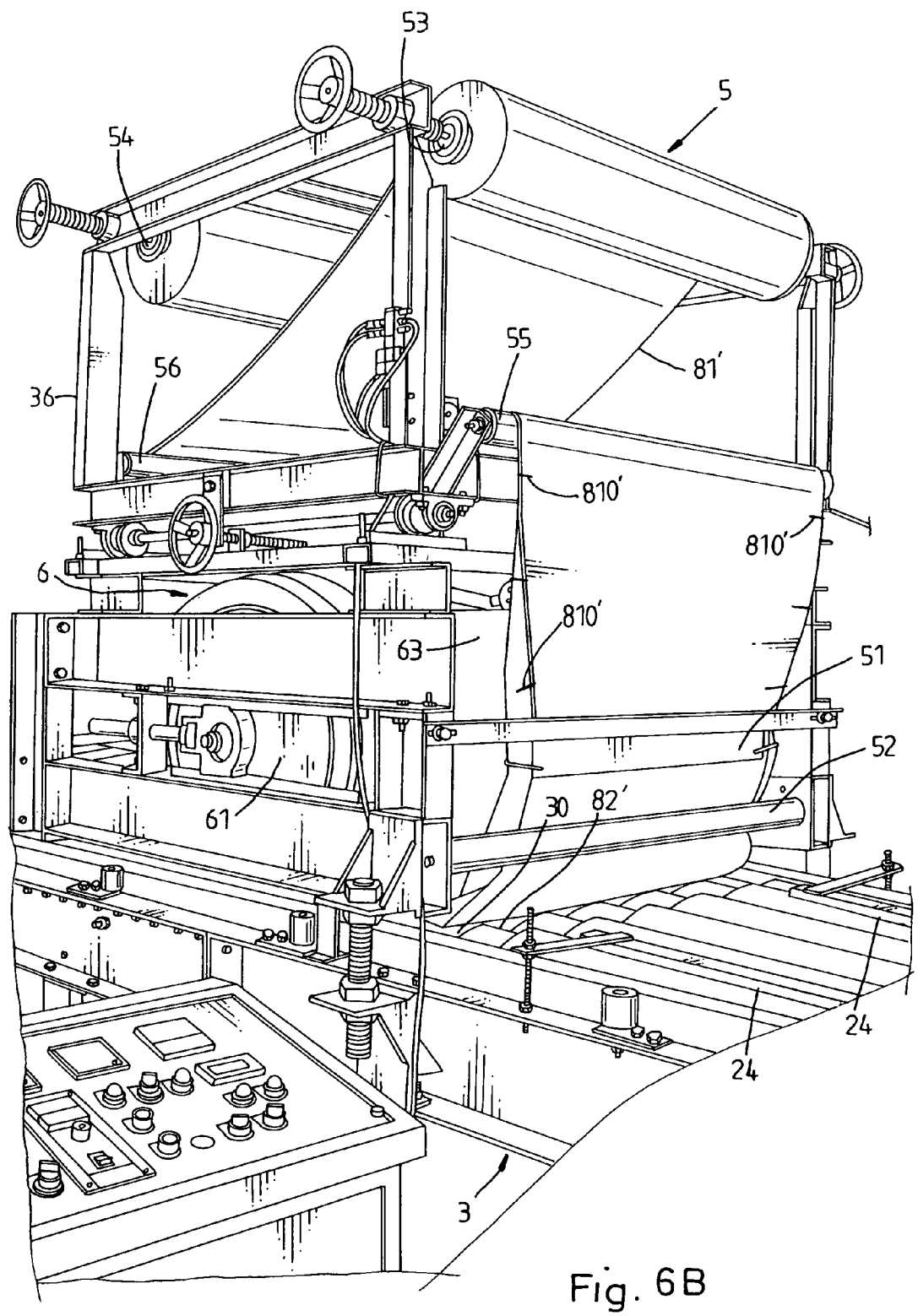
FIG. 6B corresponds to FIG. 6A, showing a thin-layer non-metal top sheet delivered and a metal encaustic tile delivered into position for processing.
Figure 6C:
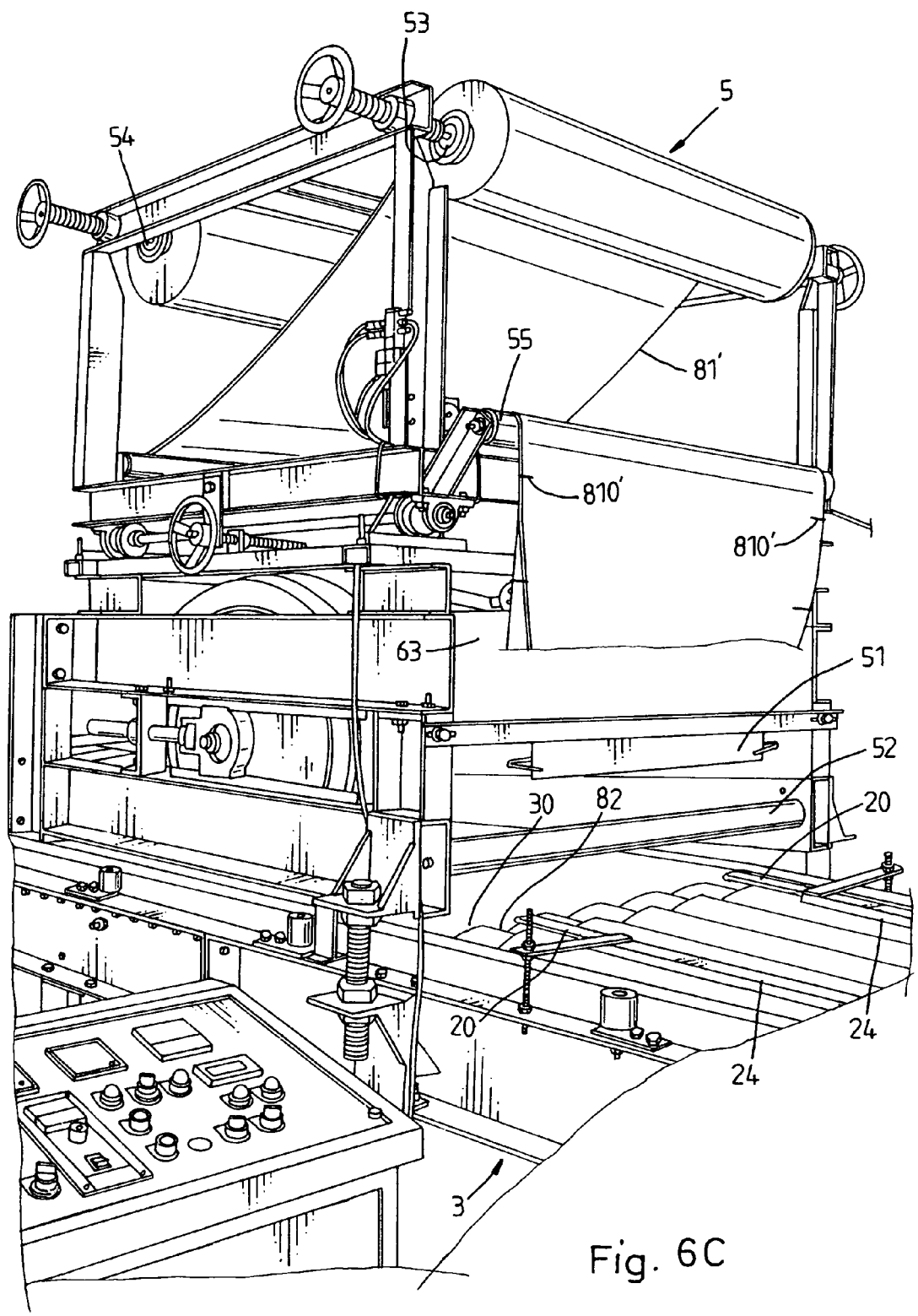
FIG. 6C corresponds to FIG. 6A, showing two thermoinsulation films and a metal encaustic tile delivered into position for processing.
Figure 7:
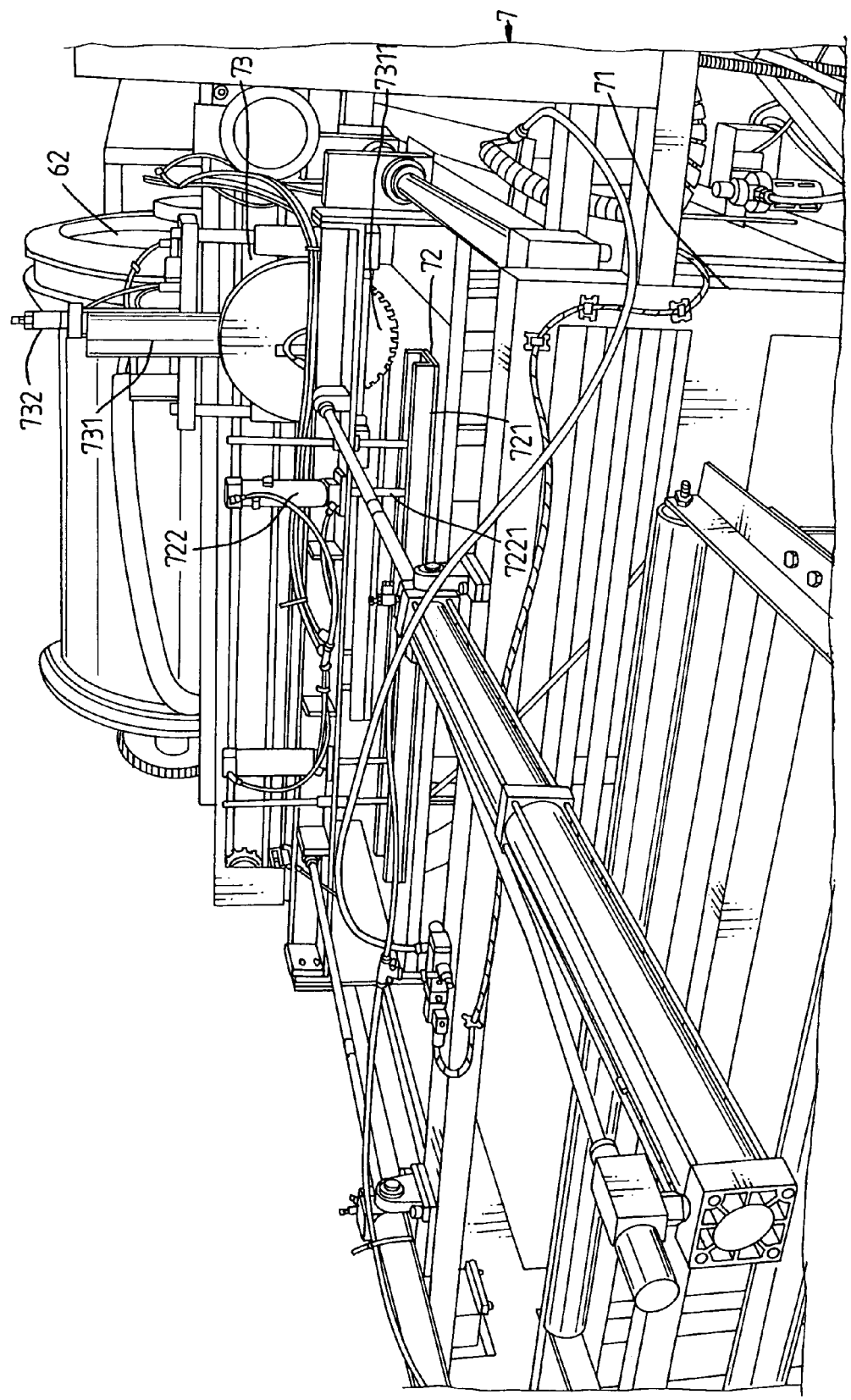
FIG. 7 is a perspective view of the rear part of the thermoinsulation metal encaustic tile making machine according to the present invention.

The top metal sheet shape-forming roller unit 1 is provided at the top of the front side of the machine base 3 and adapted to roller-ram a metal sheet material into a predetermined shape of top metal sheet 81 having a corner flange 811 (see FIG. 2). The top metal sheet shape-forming roller unit 1 comprises a support frame 13, a roller holder frame 11 mounted on the top side of the support frame 13 in a sloping position, and a plurality of ramming rollers 12 installed in the roller holder frame 11 and adapted to ram the supplied metal sheet material into the desired top metal sheet 81 having a corner flange 811, for enabling the top metal sheet 81 to be delivered forwards by the top guide assemblies 31 and 32 of the machine base 3 to the place between the front side of the top transferring mechanism 6 and a metal encaustic tile conveyer 30 (see FIG. 6C).

The thermoinsulation film feeder 2 (see FIG. 4) is fixedly fastened to the top of the front side of the machine base 3 by a mounting frame 21, comprising a flat bottom frame 22 set in a sloping position below the elevation of the guide rollers 311 and 321 of the top guide assemblies 31 and 32 at the machine base 3, two upright reels 23 bilaterally provided at the top side of the flat bottom frame 22, and two rolls of thermoinsulation films 20 respectively loaded on the upright reels 23, two sets of tension rods 25 bilaterally provided at the top side of the flat bottom frame 22 and adapted to guide the thermoinsulation films 20 out of the upright reels 23 to a respective biasing tube 24 (see FIG. 8).

The machine base 3 comprises a metal encaustic tile conveyer 30, which has a plurality of recessed portions 301 for the positioning of metal encaustic tiles 82 (see also FIG. 2) to be delivered, top guide assemblies 31 and 32, a support frame 33 supporting the biasing tubes 24 of the thermoinsulation film feeder 2, a nozzle holder 34 adapted to support the jet nozzle assembly 41 of the polyurethane foaming unit 4, a top rack 35, which is spaced from the nozzle holder 34 at a proper distance and supports the rack 36 of the top sheet feeder 5 (see FIG. 9), a top cover 38 at the top of the rear side, and a drying unit (not shown) mounted under the top cover 38.

The polyurethane foaming unit 4 comprises a polyurethane foam making device 40 (see also FIG. 9), and a jet nozzle assembly 41 extended from the polyurethane foam making device 40 and pivotally mounted in the nozzle holder 34. The jet nozzle assembly 41 comprises a nozzle tube 411 controlled to spray polyurethane foam.

The top transferring mechanism 6 comprises a front transmission cylinder 61 pivotally mounted inside the top rack 35 of the machine base 3, a rear transmission cylinder 62 pivotally mounted in the top of the rear side of the machine base 3 under the top cover 38 (see also FIG. 7), and a conveying belt 63 coupled between the front transmission cylinder 61 and the rear transmission cylinder 62 and spaced from the metal encaustic tile conveyer 30 of the machine base 3 at a proper distance. The top cover 38 of the machine base 3 shields the major part of the conveying belt 63 (see FIG. 3).

The cutting unit 7 (see FIG. 7) is abutted against the rear side of the machine base 3, comprising a rack 71, a material clamping device 72 provided at the top side of the rack 71, and a cutter assembly 73 provided at the top side of the rack 71. The cutter assembly 73 comprises a cutter holder 731, an air cylinder 732 mounted in the rack 71 and adapted to lift/lower the cutter holder 731, and a rotary cutter blade 7311 pivoted to the cutter holder 731 and adapted to cut off the processed thermoinsulation metal encaustic tile 8 or 8'. The material clamping device 72 comprises a clamping plate 721, and a plurality of vertical air cylinders 722 vertically disposed above the clamping plate 721. The vertical air cylinders 722 have the respective pistons 7221 respectively connected to the clamping plate 721. When extended out of the pistons 7221 of the vertical air cylinders 722, the clamping plate 721 is lowered to hold down the processed thermoinsulation metal encaustic tile 8 or 8' for cutting.

When making a thermoinsulation metal encaustic tile 8' having a thin-layer non-metal top sheet 81', the thin-layer non-metal top sheet 81' is extended out of the sheet supply roll 53 of the top sheet feeder 5 and guided by the guide roller 55 to pass over the locating frame 51 and the guide shaft 52 and to further pass through the gap between the conveying belt 63 of the top transmission mechanism 6 and the metal encaustic tile conveyer 30 of the machine base 3 above the metal encaustic tile 82' carried on the metal encaustic tile conveyer 30 (see FIG. 6), and then the polyurethane foam making device 40 of the polyurethane foaming unit 4 is controlled to eject polyurethane foam 80' out of the nozzle tube 411 of the jet nozzle assembly 41 to the space between the thin-layer non-metal top sheet 81' and the metal encaustic tile 82'. The thin-layer non-metal top sheet 81' and the metal encaustic tile 82' with the supplied polyurethane foam 80' are carried backwards by the conveying belt 63 of the top transmission mechanism 6 and the metal encaustic tile conveyer 30 of the machine base 3 and then dried by the drying unit under the top cover 38 to form the desired thermoinsulation metal encaustic tile 8' having a thin-layer non-metal top sheet 81', which is then held down by the material clamping device 72 of the cutting unit 7 into the finished product subject to the desired length.

When making a thermoinsulation metal encaustic tile 8 having a top metal sheet 81, the prepared top metal sheet 81 is roller-rammed by the top metal sheet shape-forming roller unit 1 into the desired shape having a corner flange 811 (see FIG. 2) and then guided by the top guide assemblies 31 and 32 at the machine base 3 to the space between the conveying belt 63 of the top transmission mechanism 6 and the metal encaustic tile conveyer 30 of the machine base 3 (see FIG. 6C), and at the same time thermoinsulation films 20 are guided by the tension rods 25 into the respective biasing tubes 24 and then extended through the gap between the conveying belt 63 of the top transmission mechanism 6 and the metal encaustic tile conveyer 30 of the machine base 3 (see FIG. 6C) and suspended between the top metal sheet 81 and the metal encaustic tile 82, and then the polyurethane foam making device 40 of the polyurethane foaming unit 4 is controlled to eject polyurethane foam 80' out of the nozzle tube 411 of the jet nozzle assembly 41 to the space between the top metal sheet 81 and the metal encaustic tile 82. The top metal sheet 81 and the metal encaustic tile 82 with the supplied polyurethane foam 80' are carried backwards by the conveying belt 63 of the top transmission mechanism 6 and the metal encaustic tile conveyer 30 of the machine base 3 and then dried by the drying unit under the top cover 38 to form the desired thermoinsulation metal encaustic tile 8 having a top metal sheet 81, which is then held down by the material clamping device 72 of the cutting unit 7 into the finished product subject to the desired length.

Figure 8:
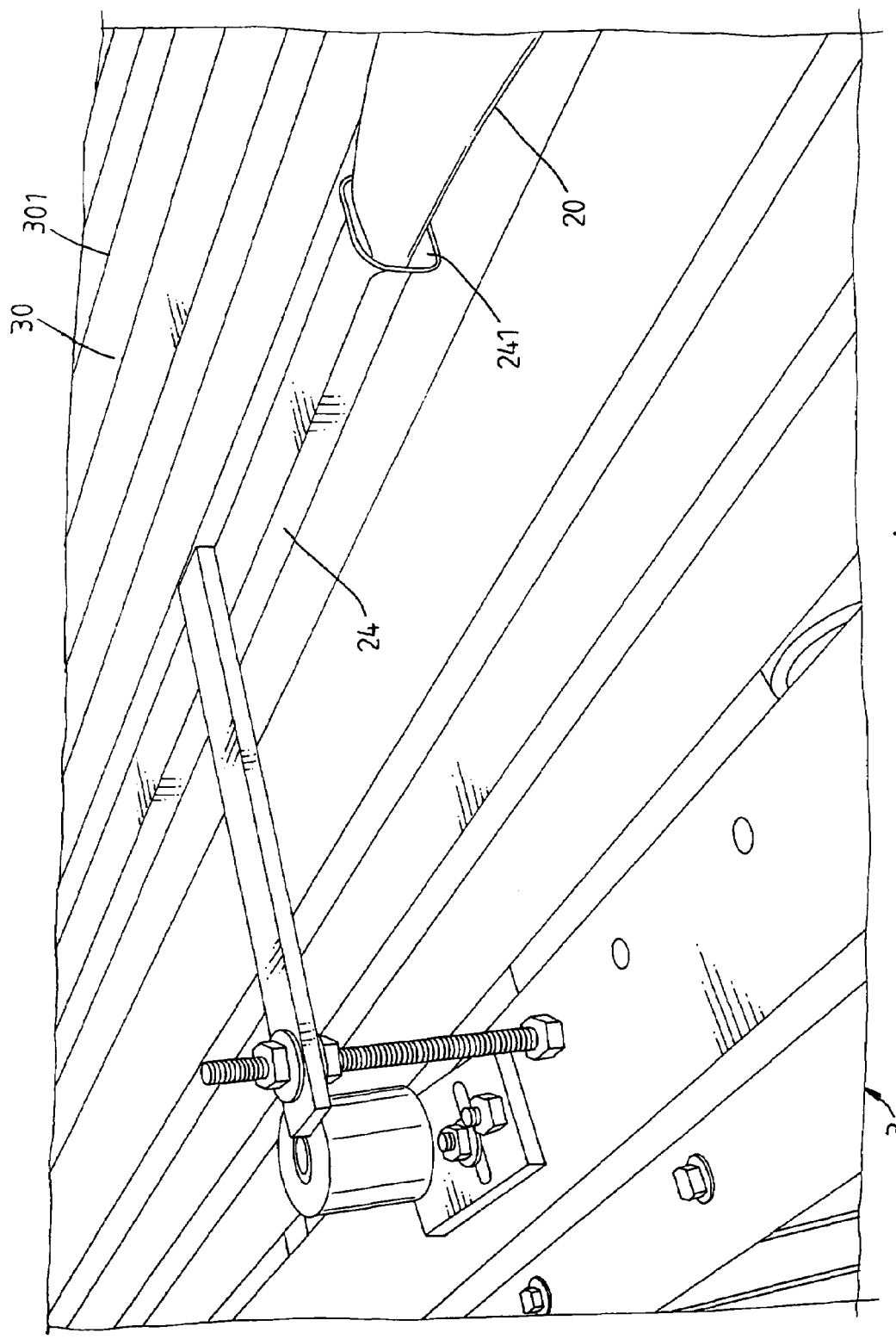
FIG. 8 is a perspective enlarged view of a part of the present invention, showing the biasing tubes arranged on the support frame of the machine base.
Figure 9:
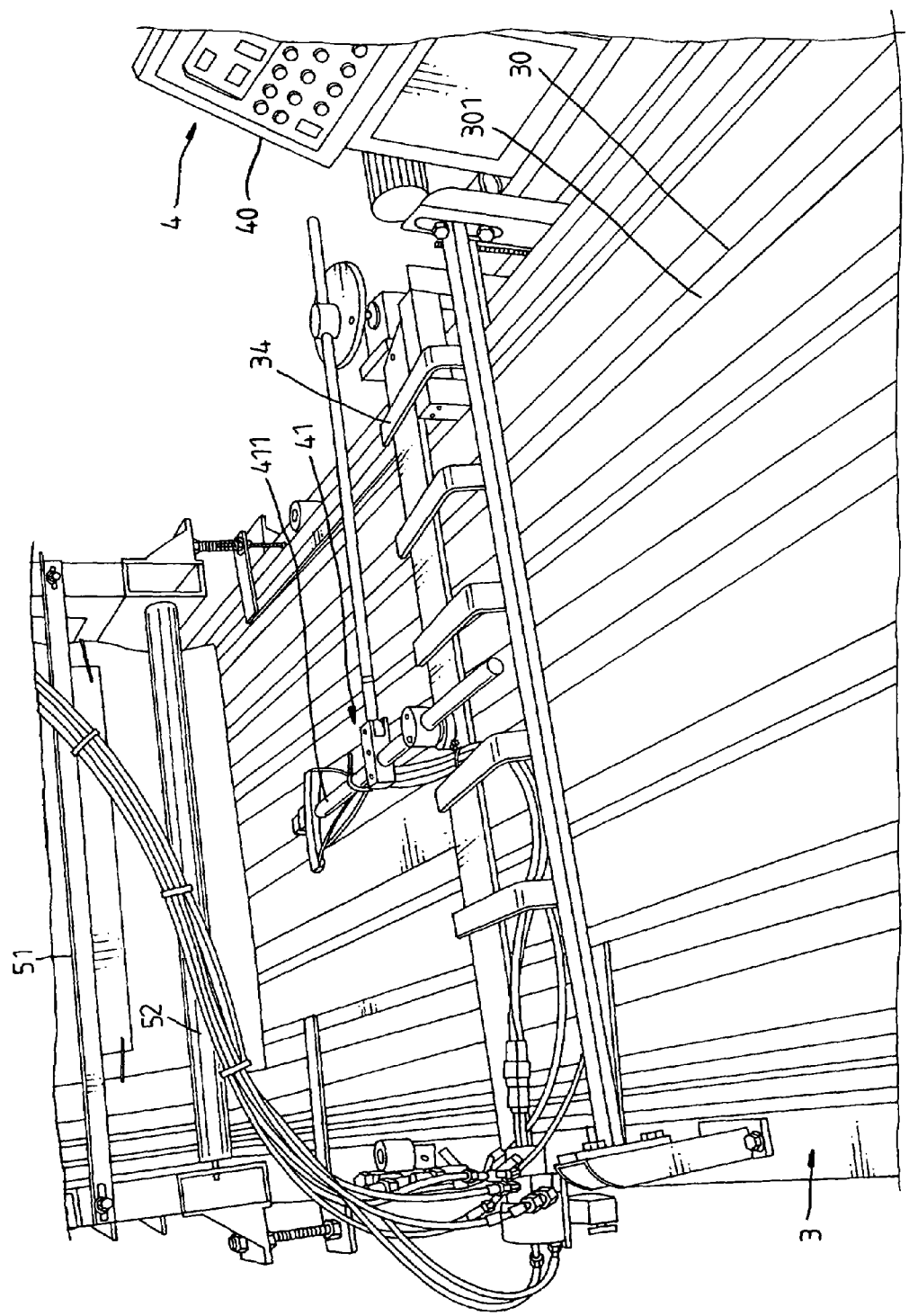
FIG. 9 is a perspective enlarged view of a part of the present invention, showing the arrangement of the polyurethane foaming unit.
Figure 10:
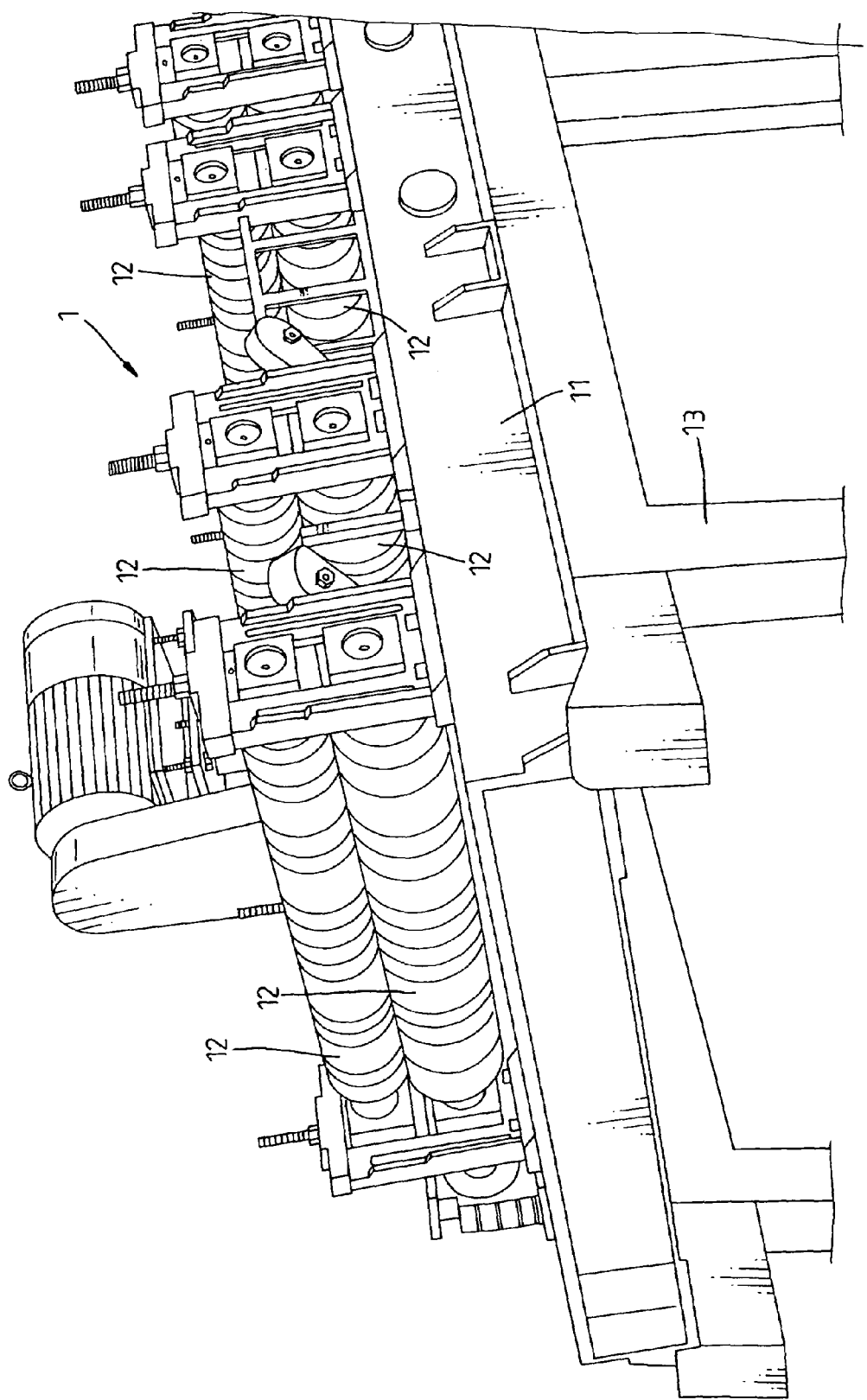
FIG. 10 is a perspective enlarged view of a part of the present invention, showing the top metal sheet shape-forming roller unit.

Referring to FIG. 8, the biasing tubes 24 each define a longitudinally extended flat channel 241, which has a conical front guide face for guiding a thermoinsulation film 20 into the respective longitudinally extended flat channel 241, so that the thermoinsulation film 20 is slightly curved when passing through the longitudinally extended flat channel 241.

Further, the thin-layer non-metal top sheet 81' supplied from the sheet supply roll 53 or 54 of the top sheet feeder 5 can be a sheet of polyvinyl chloride (polyvinyl chloride), leather, or aluminum foil material.

As indicated above, the invention has the following advantages:

1. The machine is practical to selectively make thermoinsulation metal encaustic tiles 8' having a thin-layer non-metal top sheet 81' or thermoinsulation metal encaustic tiles 8 having a top metal sheet 81 automatically, and the finished product is automatically cut subject to the desired length so save labor and time.

2. Before guiding the thin-layer non-metal top sheet 81' to the gap between the conveying belt 63 of the top transmission mechanism 6 and the metal encaustic tile 82' at the metal encaustic tile conveyer 30 of the machine base 3, the two rotary cutters 57 are operated to cut two transverse crevices 810' in the two opposite lateral sides of the thin-layer non-metal top sheet 81' so that the thin-layer non-metal top sheet 81' does not wrinkle when processed with the metal encaustic tile 82' and the polyurethane foam 80' to form the desired thermoinsulation metal encaustic tile 8'.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A thermoinsulation metal encaustic tile making machine comprising:

a machine base, said machine base comprising a metal encaustic tile conveyer, which has a plurality of recessed portions for the positioning of metal encaustic tiles to be delivered, top guide assemblies, a support frame for supporting biasing tubes of a thermoinsulation film feeder, a nozzle holder adapted to support a jet nozzle assembly of a polyurethane foaming unit, a top rack spaced from said nozzle holder at a distance for supporting a rack of a top sheet feeder, a top cover covering over a rear side thereof, and a drying unit mounted under said top cover;

said top sheet feeder comprising said rack mounted on the top rack of said machine base at a top side, a locating frame provided at a front side of the top rack of said machine base, a guide shaft provided at a front side of the top rack of said machine base and spaced below said locating frame, two sheet supply rolls and provided at a top side of the rack of said top sheet feeder, two guide rollers respectively provided at front and rear sides of the rack of said top sheet feeder, and two rotary cutters bilaterally provided at a front side of the rack of said top sheet feeder and adapted to rotate a respective cutter blade thereof to cut a respective transverse crevice in two opposite lateral sides of a supplied top sheet member;

a top metal sheet shape-forming roller unit provided at a front side of said machine base and adapted to roller-ram a metal sheet material into a predetermined shape of top metal sheet having a corner flange, said top metal sheet shape-forming roller unit comprising a support frame, a roller holder frame mounted on said support frame at a top side in a sloping position, and a plurality of ramming rollers installed in said roller holder frame and adapted to ram the supplied metal sheet material into the desired top metal sheet having a corner flange, for enabling the top metal sheet to be delivered forwards by said top guide assemblies of said machine base to the place between a front side of said top transferring mechanism and a metal encaustic tile conveyer;

said thermoinsulation film feeder fixedly fastened to said front side of said machine base, said thermoinsulation film comprising a flat bottom frame set in a sloping position below the elevation of said guide rollers of said top guide assemblies at said machine base, two upright reels bilaterally provided at a top side of said flat bottom frame, and two rolls of thermoinsulation films respectively loaded on said upright reels, two sets of tension rods bilaterally provided at a top side of said flat bottom frame and adapted to guide said thermoinsulation films out of said upright reels to a respective biasing tube;

said polyurethane foaming unit comprising a polyurethane foam making device for processing polyurethane into polyurethane foam, and said jet nozzle assembly extended from said polyurethane foam making device and pivotally mounted in said nozzle holder, said jet nozzle assembly comprising a nozzle tube controlled to spray polyurethane foam;

a top transferring mechanism, said top transferring mechanism comprising a front transmission cylinder pivotally mounted inside the top rack of said machine base, a rear transmission cylinder pivotally mounted in said machine base under said top cover, and a conveying belt coupled between said front transmission cylinder and said rear transmission cylinder and spaced from said metal encaustic tile conveyer of said machine base at a distance; and a cutting unit abutted against said machine base at a rear side, said cutting unit comprising a rack of said cutting unit, a material clamping device provided at a top side of the rack of said cutting unit, and a cutter assembly provided at a top side of the rack of said cutting unit, the cutter assembly of said cutting unit comprising a cutter holder, an air cylinder mounted in the rack of said cutting unit and adapted to lift/lower the cutter holder of said cutting unit, and a rotary cutter blade pivoted to the cutter holder of said cutting unit and adapted to cut off the processed thermoinsulation metal encaustic tile, said material clamping device comprising a clamping plate and a plurality of vertical air cylinders vertically disposed above said clamping plate and adapted to move said clamping plate vertically and to hold down the processed thermoinsulation metal encaustic tile for cutting.

2. The thermoinsulation metal encaustic tile making machine as claimed in claim 1, wherein each said biasing tube defines a longitudinally extended flat channel, which has a conical front guide face for guiding a respective thermoinsulation film into the respective longitudinally extended flat channel, so that the thermoinsulation film is slightly curved when passing through the longitudinally extended flat channel.

3. The thermoinsulation metal encaustic tile making machine as claimed in claim 1, wherein the thin-layer non-metal top sheet supplied from said sheet supply roll is selected from a material group including polyvinyl chloride, leather, and aluminum foil material.

* * * * *